(No Model.)
G. F. FOOTE.
PROCESS OF AND APPARATUS FOR PRESERVING FOOD.
No. 285,741. Patented Sept. 25, 1883.
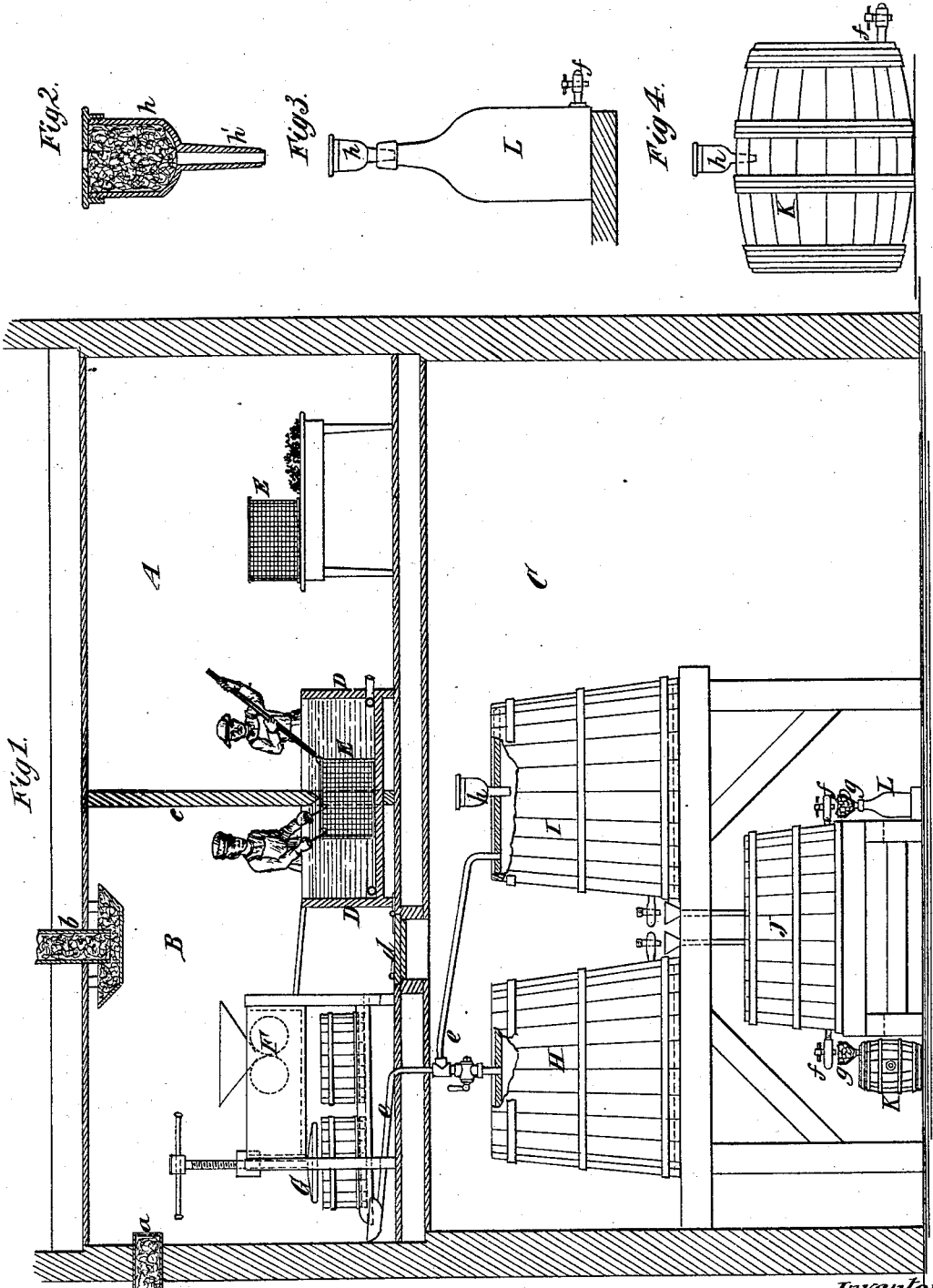

UNITED STATES PATENT OFFICE.

GEORGE F. FOOTE, OF STAMFORD, CONNECTICUT.

PROCESS OF AND APPARATUS FOR PRESERVING FOOD.

SPECIFICATION forming part of Letters Patent No. 285,741, dated September 25, 1883.

Application filed January 5, 1883. (No model.)

*To all whom it may concern:*

Be it known that I, GEORGE F. FOOTE, a citizen of the United States, and a resident of Stamford, in the county of Fairfield and State of Connecticut, have invented an Improvement in a Process and Apparatus for Preserving Organic Substances, by which terms I mean substances either vegetable or animal, their juices or extracts, obtained either by compression, percolation, maceration, decoction, or other analogous operations; and I hereby declare that the following is a full, clear, and exact description of the same, reference being had to the accompanying drawings, forming a part of this specification.

The germs and spores which excite or produce fermentation, putrefaction, and molds exist in the atmosphere in the form of fine dust, and they attach themselves to organic and other substances. Such germs and spores are destroyed at certain high temperatures, and they will not propagate below certain temperatures, while above the latter and between such temperatures they will propagate with rapidity.

The object of my invention is the preservation of organic substances, their juices or extracts, against any and all germs and spores of fermentation, putrefaction, and molds: first, by destroying all such germs and spores that may be attached to (or connected with the surface of) substances to be preserved; secondly, to exclude them from the rooms in which those substances are to be manipulated; thirdly, to render inoperative and ultimately remove any germs or spores that might for want of proper care yet remain on or in or commingled with the articles to be preserved; fourthly, to prevent their introduction into the vessels holding such articles with the ventilating-air while these are being withdrawn or taken into other receptacles.

My invention is utilized in treating and preserving all kinds of organic matter, their juices or extracts, without cooking, and the substances so treated and preserved may be kept in all climates and seasons without decomposition or putrefaction.

The apparatus which I employ is illustrated in the accompanying drawings, in which Figure 1 represents a sectional elevation of three rooms, A B C, and the apparatus or machinery contained therein. Fig. 2 represents a sectional view of a germ and spore sealed vent adapted to be inserted into a cask or other receptacle, through which absolutely pure air may enter as the liquid is drawn therefrom. Fig. 3 is a bottle, and Fig. 4 a cask with the vent applied.

The room A may be entered from the outside without special care. The rooms B and C are made air-tight by any suitable means, except at the openings hereinafter specified. The rooms B and C are carefully protected from all outside contamination by germs and spores, and the room B has a ventilating-opening at b, which is covered or filled with cotton, wool, asbestus, sponge, or other porous material, which may be impregnated with any antizymotic, antiseptic, or unctuous matter, as glycerine, thereby excluding the germs and spores of fermentation and molds. The room B is entered through a shower or spray. Such shower or spray may be produced by means of a number of jet-pipes supplied with water or liquid. Such shower or spray prevents the introduction of germs and spores of any kind. Before entering the inclosure B and C, all persons should wash their hands and faces in warm water to which some antizymotic or antiseptic agent has been added. They should also change their outer garments for rubber garments dipped in boiling water. The hair should be covered with a rubber cap. The only other communication between the rooms A and B is through an opening provided in the partition c, below the surface of hot water contained in the tank D, which extends through and on both sides of said partition. The water therefore forms a seal to said openings. The only entrance from the room B to the room C is by a trap-door, d. The room C should have non-conducting walls, and be maintained at a temperature lower than that at which the germs will propagate.

Prior to using the rooms B and C for the purpose of my invention, their entire interior surfaces should be scalded with hot water or steam at intervals of about twelve hours for three or four days, after which their inner surfaces should be kept damp; or they may be coated with an unctuous matter—such as glycerine or castor-oil—either with or without combination with an antizymotic or antiseptic agent, such as sulphur. Before using the rooms they should remain vacant for three or four days to allow any germs or spores to attach themselves to the surfaces thereof and become destroyed.

The substances to be treated are carefully assorted in the room A. They are placed in the basket or receptacle E, of reticulated construction, and immersed in the liquid of the tank D, passed through the partition c into the room B. The contents of the tank D should be kept heated to a temperature of 212° Fahrenheit by means of a steam-coil or otherwise, and in its passage the scalding water has access to and washes all the exposed parts of the substances in the basket, and destroys any germs or spores of ferment, putrefaction, or molds that may be attached thereto. If these substances are to be preserved in cans or jars, the final process may be completed in the room C; but if the juices are to be extracted therefrom the room B should contain appliances for crushing and pressing. After grinding and pressing, the juices are conducted through the pipe e down into the room C and into the tanks shown at H and I, where they remain until they shall have cleared themselves by precipitation, when they are racked off into the tank J, from which they are to be bottled or barreled.

In case any small number of germs should by any means get into the juices or substances before passing into the room C, they will be prevented from propagating by the frigid atmosphere of the room; and if they get into the juices they will be precipitated in the tanks H and I and be removed with the dregs.

All bottles, cans, casks, or corks should be thoroughly heated by being passed through the boiling liquid in the tank D as they pass into the room B, from which they are taken down into the room C through the trap-door d. I admit the air necessary to give vent to the cask or receptacle as the liquid is drawn therefrom through the germ and spore sealed vent herein described. The tanks H I have their apertures closed by corks or spigots. After being filled, and when it is desired to withdraw their contents, the filter h and faucet f are driven into the apertures, forcing the corks or spigots into the receptacle.

Before using, all corks or germ and spore vents and faucets, as well as the surfaces to which they are applied or inserted, should be thoroughly scalded or burned with an alcohol-lamp, to destroy any germs and spores that may be attached to them. The vent I have shown at Fig. 1 attached to the tank I in the room C.

There are openings in the room B at a and b, for purposes of ventilation. They are provided with filters of cotton, wool, asbestus, or other suitable material, which may be charged with unctuous, antizymotic, or antiseptic substances, which protect the room from the ingress of germs or spores from the exterior. The germ and spore tight rooms B and C contain the mill F, the press G, the tanks H, I, and J, and any and all other appliances to the proper manipulation of the substances to be operated upon in said compartments.

In Figs. 2, 3, and 4 are illustrated the construction and use of my germ and spore seal vent, the object of which is hereinbefore specified; but to which filter-vent I herein make no claim. It has a funnel-shaped metallic body, h, with nozzle h', said nozzle having formed therein a central longitudinal air-passage, and also having a detachable and attachable cap or cover, said cap or cover having a small central opening for the admission of air into the said body. In use the detachable cap or cover is removed from the body of the vent and the body is stuffed or packed with fibrous or porous material, such as cotton, wool, asbestus, &c. Said fibrous or porous material may be either saturated or non-saturated with unctuous, antizymotic, or antiseptic material, as may be desirable or necessary. In the germ and spore tight inclosures or rooms B C are also performed all the operations of peeling, slicing, and other manipulations required in the preparation of the crude articles for preservation and use, it being the prominent feature of my process that these operations shall be performed in an atmosphere uncontaminated, and prevented from contamination by a germ and spore tight inclosure, substantially as herein described.

While my invention has been described as primarily designed for the preservation of organic substances without cooking or boiling, I do not therefore intend to limit its application to cold processes only, but reserve the right to use such features of it as may be found applicable to processes in the carrying out of such processes wherein the cooking or heating prior to hermetical sealing may be beneficial or desirable.

I do not claim the canning of organic substances, vegetable or animal, or the preservation of their juices by bottling after heating, for these are of common use; neither do I claim canning of organic substances or their juices in cans, jars, or bottles from which the germ has been excluded by heat; but What I do claim as my invention, and desire to secure by Letters Patent, is—

1. The improved method of preparing and preserving organic substances, their juices or extracts, hereinbefore described, consisting in first destroying the germs thereon by immersion in a heated fluid, then preparing the substances for and sealing or inclosing the same in air-tight vessels, the latter steps being conducted in an apartment having an atmosphere from which the germs of fermentation or putrefaction have been removed, substantially as shown.

2. The combination, in an apparatus for the preservation of organic substances, of the two compartments A and B, in one of which the substances are first received, prepared, and assorted, and the other of which, B, is freed and kept free from germs of ferment, substantially as shown, with a communicating tank or box, D, located in the partition between the rooms, for containing a heated fluid, substantially as and for the purposes herein described.

3. The combination, in an apparatus for the preservation of organic substances, their juices or extracts, of the compartments A and B, (the latter of which is kept free from germs of ferment,) and having the communicating tank D, for heated fluid, located in the partition between the two, with compartment C, contiguous to or placed at a lower level, and having its atmosphere refrigerated or kept at a degree below that at which the germs or spores will propagate and multiply, substantially as set forth.

GEO. F. FOOTE.

Witnesses:
FREDK. HAYNES,
ED. L. MORAN.